United States Patent [19]

Lorenz

[11] Patent Number: 4,674,901
[45] Date of Patent: Jun. 23, 1987

[54] THERMOCOUPLE BIASING CIRCUIT
[75] Inventor: William Lorenz, South Bend, Ind.
[73] Assignee: Allied Corporation, Morristown, N.J.
[21] Appl. No.: 812,494
[22] Filed: Dec. 23, 1985
[51] Int. Cl.⁴ .............................................. G01K 7/14
[52] U.S. Cl. .................................. 374/169; 324/115;
374/144; 374/179
[58] Field of Search ............... 374/163, 144, 179, 169,
374/172; 324/115

[56]  References Cited
U.S. PATENT DOCUMENTS

| 2,985,016 | 5/1961 | Wright, Jr. ..................... 374/144 X |
| 3,051,847 | 8/1962 | Niemeyer ......................... 307/310 X |
| 3,318,151 | 5/1967 | Behrendt et al. .................... 374/144 |
| 4,315,211 | 2/1982 | Walsh ............................. 324/115 X |
| 4,440,508 | 4/1984 | Haloburdo, Jr. et al. ...... 374/179 X |
| 4,573,806 | 3/1986 | Moore et al. ................... 374/179 X |
| 4,608,532 | 8/1982 | Ibar et al. ....................... 324/115 X |

Primary Examiner—Daniel M. Yasich
Attorney, Agent, or Firm—Ronald D. Welch; Ken C. Decker

[57]  ABSTRACT

A temperature measuring circuit which includes a primary temperature sensor such as a thermocouple, an external source for generating predetermined temperature modifying signals, and a signal combining circuit for combining the modifying signals with the temperature sensor signal to generate a modified output signal and display thereof.

4 Claims, 1 Drawing Figure

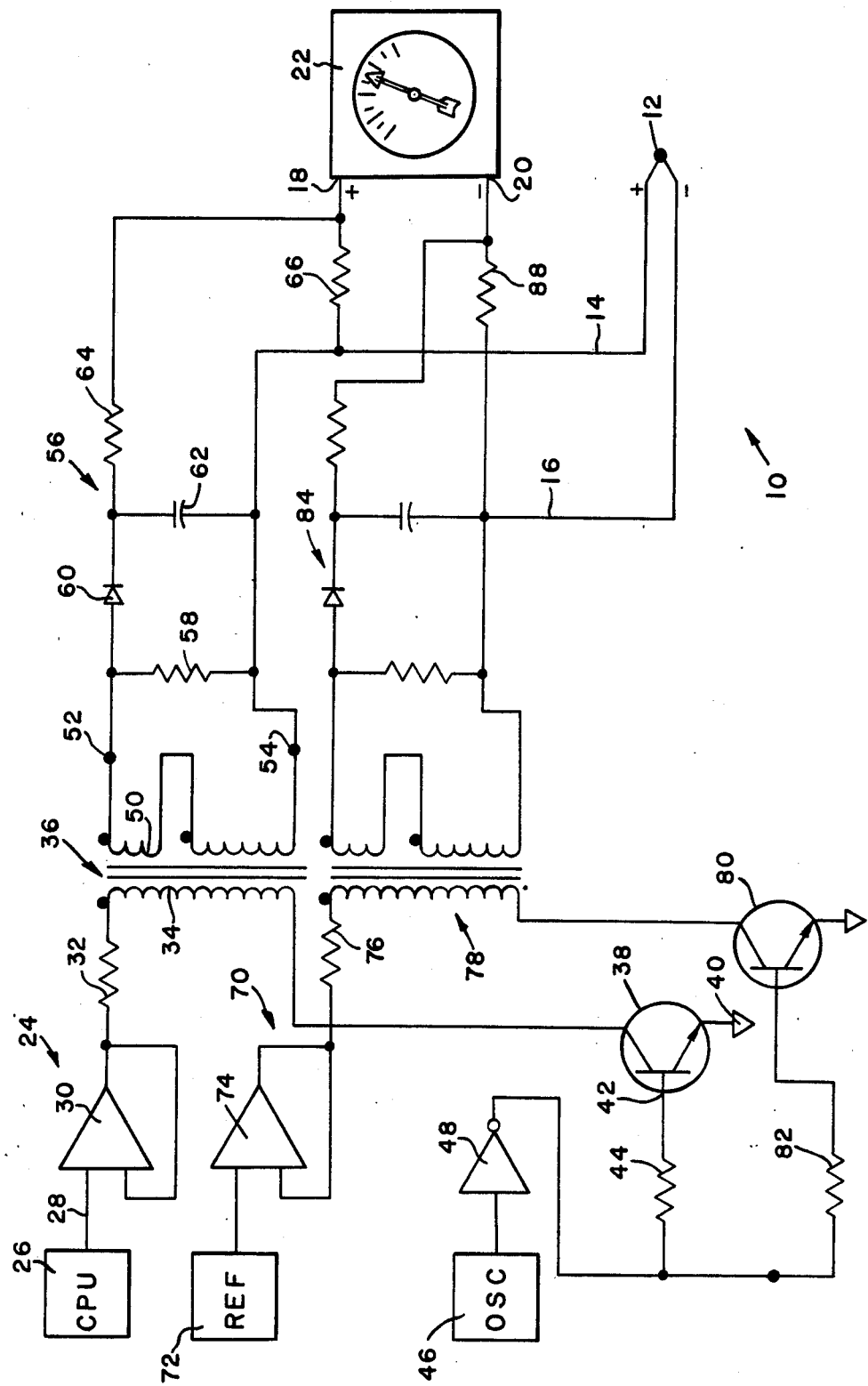

THERMOCOUPLE BIASING CIRCUIT

FIELD OF THE INVENTION

The present invention relates to circuits for measuring temperature and more particularly to such a circuit for combining one or more biasing or offset signals with the thermocouple signal to provide a modified signal to a display.

The thermocouple is a commonly used and effective device for the measurement of temperature. One such application for the thermocouples is in the electronic control system used in aircraft engines. In these systems, temperatures such as those of the fuel, air, and cylinders are measured and input to a central computing system to generate control signals for the aircraft's engine. In such systems, it will be recognized that the thermocouples represent but one part of a complex control system which includes a substantial amount of wiring and display equipment as well as various alarm devices.

Because the operating life of an aircraft can be substantial and because aircraft power plants are constantly being improved, it is common for an aircraft to be periodically upgraded to incorporate technological advances. Under such circumstances, it is common for the operating temperatures and temperature limits of the aircraft to change significantly from those applicable to the original aircraft configuration. Accordingly, it is frequently necessary to modify or change a significant number of components of the aircraft such as the temperature indicators and alarms in the course of an aircraft upgrade. This obviously entails substantial expense and it is desirable to minimize same.

In its broader aspects, the present invention is a temperature measuring circuit which includes a primary temperature sensing means such as a thermocouple for generating an electrical temperature signal which corresponds to a sensed temperature. A display device is coupled to the temperature sensing means and generates a display representative of the temperature signal. A computing circuit is provided for generating a display modifying signal and the circuit includes a signal combining circuit for combining the temperature signal and the display modifying signal.

In a specific embodiment of the invention, the primary temperature sensor is a thermocouple, and the combining circuit includes an isolation circuit and a low impedance load circuit connected in series with the thermocouple so that normal operation of the thermocouple circuit is substantially unaffected by the combining circuit.

It is therefore an object of the invention to provide a circuit for modifying the output signal from a temperature sensor such as a thermocouple.

Another object of the invention is to provide such a circuit which combines a predetermined modifying signal with a thermocouple signal to effect a display of temperature corresponding to the combined signal.

Still another object of the invention is to provide such a circuit which includes an isolation circuit and a low impedance load circuit which has substantially negligible effect on normal operation of the thermocouple circuit.

Another object of the invention is to provide a circuit with a plurality of combining circuits and externally generated modifying signals to enable generation of an output signal to a display device which is modified in accordance with a plurality of predetermined signal modification schemes.

These and other objects of the invention will be best understood in view of the attached drawings and the following specification wherein the FIGURE is a schematic diagram of the temperature sensing circuit of the invention.

DESCRIPTION OF THE PREFERRED EMBODIMENT

Referring now to the drawing, there is shown a circuit, indicated generally at 10. The basic thermocouple circuit having a thermocouple 12 which may be mounted appropriately in a machine such as a gas turbine engine to sense a temperature. The thermocouple 12 generates an output emf which is applied via conductors 14 and 16 to the input terminals 18, 20 of a display device 22. Device 22 may be any conventional well known display providing an analogue, digital or other form of temperature indication. Typically, the device 22 will have a relatively high input impedance at its input terminals 18, 20.

A first thermocouple modifying signal generating circuit 24 derives a basic DC modifying signal from a source such as the central processing unit (CPU) of an engine control system 26. This DC voltage passes via conductor 28 to a buffer amplifier 30 and load resistor 32 to the input winding 34 of an isolation transformer 36. The opposite end of input winding 34 is connected through the load circuit of a transistor 38 to ground 40. The base 42 of transistor 38 is connected through bias a resistor 44 to the output of an oscillator 46 and buffer amplifier 48. Thus connected, transistor 38 will act as a switch or "chopper" converting the DC signal output from buffer amplifier 30 to an alternating current signal. This signal is inductively fed to the output windings 50 of the transformer 36. The output terminals 52, 54 are connected to a filter and a rectifier circuit 56 comprising parallel connected resistor 58, diode 60, capacitor 62, and series connected resistor 64. The output from the filter circuit 56 is applied across a low resistance (10 ohms or less) resistor 66 which is connected in series with conductor 14.

In operation, the central processing unit 26, in response to predetermined operating conditions, generates a direct current output signal which is passed by conductor 28 to the buffer amplifier 30. The output from the buffer amplifier 30 is passed through the primary winding 34 of transformer 36. This direct current signal is chopped by the transistor 38 in response to the oscillator signal received from oscillator 46. The chopped signal is inductively transmitted to the output winding 50 of transformer 36 and is subsequently rectified and filtered by the circuit 56. The rectified and filtered signal is again a direct current signal having a magnitude determined by the circuit parameters. This signal is then utilized to generate an emf across the resistor 66. As illustrated, this signal is additive. That is, this signal will increase the emf generated by thermocouple 12 applied to the display 22. Since the display 22 has a relatively high input impedance, the small resistance of resistor 66 will have negligible effect on the normal thermocouple circuit.

In application, this circuit may be utilized in a temperature monitoring circuit of an aircraft. For example, if such am aircraft had been modified with an upgraded engine, the maximum gas temperature of the engine may be increased from an initial specification of 1500°

Fahrenheit to 1200° Fahrenheit during peak power conditions such as during take off. Accordingly, the central processing unit of the aircraft (26) generates an output signal which result in an emf across resistor 66 which corresponds to 300° centigrade. This signal will be combined with the thermocouple EMF to produce a modified EMF or signal that is applied to the display 22. The display 22 will, under these conditions, indicate a 1500° gas temperature when, in fact, the gas temperature is 1200° centigrade. By using this technique, the original display and corresponding temperature limits indicated thereby do not need to be changed. Retraining of the aircraft's pilot or other personnel does not have to be effected. Simultaneously, this is done without damage to the engine since the modified temperature indication is, in fact, still an indication of maximum safe operating conditions. When a modified temperature indicator is no longer required, the CPU discontinues generating a signal and the thermocouple circuit operates normally.

Referring again to FIG. 1, there is shown a second signal modifying circuit indicated gererally at 70. The circuit 70 is substantially identical to that of circuit 24 but derives its voltage from a continuous reference source 72. The circuit is otherwise identical including a buffer amplifier 74, resistor 76, transformer 78, transistor 80, bias resistor 82, rectifying and filter circuit 84, and resistor 88. The second modifying signal generating circuit 70 is shown connected to produce a subtractive emf, that is, an emf which will decrease the temperature reading of the display 22 by a predetermined amount. This signal modification is useful when a thermocouple is to provide a continuous reduction in the indicated temperature. This allows the signal generated across resistor 66 to be added to provide the display with a modified signal to effect a display of a correct temperature or a reduced temperature as desired.

It will be observed that one either circuit 24 or 70 is inoperative such as, for example, when it is not desired to modify the thermocouple signal or in the event of a failure of either of these circuits, the isolation circuitry and use of low impedance resistors 66 and 88 enables the temperature sensing circuit to operate normally.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. A temperature measuring circuit comprising a primary temperature sensing means for generating an electrical temperature signal corresponding to a sensed temperature, display means coupled to said temperature sensing means for generating a display in response to said temperature signal, first and second means for generating a display modifying signal, a first and second signal combining means associated with respective ones of said first and second modifying signal generating means for combining said temperature signal and said display modifying signals, said temperature sensing means having a pair of leads connected to said display means, each said signal combining means including a resistor connected electrically in series with one of said leads, the resistance of said resistors being substantially less than the input impedance of said display means, whereby one said modifying signal is additive to the output of said thermocouple and the other of said modifying signals is substractive therefrom, and said display means will display a temperature corresponding to the combination of said temperature signal and said display modifying signals.

2. The circuit of claim 1 wherein said modifying signal generating means includes means for generating a direct current signal, a chopper circuit means for converting said direct current signal to an alternating current signal, a transformer circuit coupled to receive said alternating current signal, and a filter-rectifying circuit connected to the output of said transformer circuit, said signal combining means being connected between said filter-rectifier circuit and said temperature sensing means.

3. The circuit of claim 2 wherein said chopper circuit means includes an oscillator and a switching transistor, said switching transistor being connected in the output circuit of said direct current signal generating means and being operable between on and off conditions in response to said oscillator signal.

4. The circuit of claim 3 wherein said temperature sensing means is a thermocouple.

* * * * *